United States Patent
Schmidt et al.

(10) Patent No.: US 8,097,141 B2
(45) Date of Patent: Jan. 17, 2012

(54) FLOW DIELECTROPHORETIC SEPARATION OF SINGLE WALL CARBON NANOTUBES

(75) Inventors: Howard K. Schmidt, Cypress, TX (US); Haiqing Peng, Sugar Land, TX (US); Manuel Joao Mendes, Madrid (ES); Matteo Pasquali, Houston, TX (US)

(73) Assignee: William Marsh Rice University, Houston, TX (US)

( * ) Notice: Subject to any disclaimer, the term of this patent is extended or adjusted under 35 U.S.C. 154(b) by 531 days.

(21) Appl. No.: 12/281,444

(22) PCT Filed: Mar. 2, 2007

(86) PCT No.: PCT/US2007/063214
§ 371 (c)(1),
(2), (4) Date: Dec. 15, 2008

(87) PCT Pub. No.: WO2008/054838
PCT Pub. Date: May 8, 2008

(65) Prior Publication Data
US 2009/0283405 A1 Nov. 19, 2009

Related U.S. Application Data

(60) Provisional application No. 60/778,303, filed on Mar. 2, 2006.

(51) Int. Cl.
*B03C 5/02* (2006.01)
(52) U.S. Cl. .......................... 204/547; 977/742; 977/751
(58) Field of Classification Search .................. 204/547; 977/742, 751
See application file for complete search history.

(56) References Cited

U.S. PATENT DOCUMENTS

| | | | |
|---|---|---|---|
| 6,764,583 B2 * | 7/2004 | Miles | 204/452 |
| 7,014,747 B2 | 3/2006 | Cummings et al. | |
| 7,074,310 B2 | 7/2006 | Smalley et al. | |
| 7,115,864 B2 | 10/2006 | Colbert et al. | |
| 7,131,537 B2 | 11/2006 | Papadimitrakopoulos et al. | |
| 7,161,107 B2 | 1/2007 | Krupke et al. | |
| 7,347,981 B2 | 3/2008 | Crespi et al. | |
| 2002/0187503 A1 * | 12/2002 | Harrold et al. | 435/6 |
| 2004/0026250 A1 | 2/2004 | Cummings et al. | |

OTHER PUBLICATIONS

Krupke, et al., "Separation of metallic from semiconducting single-walled carbon nanotubes", Science, 301 (2003), pp. 344-3407.

Lutz, et al., "Macroscopic scale separation of metallic and semiconducting nanotubes by dielectrophoresis", Carbon, 43 (2005), pp. 2508-2513.

Liu, et al., "Selective purification of multiwalled carbon nanotubes by dielectrophoresis within a large array", Current App. Phys., 6 (2006), pp. 427-431.

(Continued)

*Primary Examiner* — Jeffrey T Barton
*Assistant Examiner* — J. Christopher Ball
(74) *Attorney, Agent, or Firm* — Winstead PC

(57) ABSTRACT

According to some embodiments, a method for separating a first fraction of a single wall carbon nanotubes and a second fraction of single wall carbon nanotubes includes, but is not limited to: flowing a solution comprising the nanotubes into a dielectrophoresis chamber; applying a DC voltage, in combination with an AC voltage, to the dielectrophoresis chamber; and collecting a first eluent from the dielectrophoresis chamber, wherein the first eluent comprises the first fraction and is depleted of the second fraction, wherein the first and second fractions differ by at least one of conductivity, diameter, length, and combinations thereof.

21 Claims, 5 Drawing Sheets

OTHER PUBLICATIONS

Bachillo, et al., "Structure-Assigned Optical Spectra of Single-Walled Carbon Nanotubes", Science, 298 (2002), pp. 2361-2366.

O'Connell, et al., "Band Gap Fluorescence from Individual Single-Walled Carbon Nanotubes", Science, 297 (2002), pp. 593-596.

Wilder, et al., "Electronic structure of atomically resolved carbon nanotubes", Nature, 391 (1998), pp. 59-62.

Kim, et al., "Dielectrophoresis of Surface Conductance Modulated Single-Walled Carbon Nanotubes Using Catanionic Surfactants", J. Phys. Chem. B 110 (2006), pp. 1541-1545.

Kato, et al., "Self-Assembly of Phase-Segregated Liquid Crystal Structures", Science, 295 (2002), pp. 2414-2418.

Xie, et al., "Liquid Crystal Elastomers, Networks, and Gels: Advanced Smart Materials", J. Mater. Chem., 15 (2005), pp. 2529-2550.

Peng, et al., "Dielectrophoresis Field Flow Fractionation of Single-Walled Carbon Nanotubes", J. Am. Chem. Soc., 128 (2006), pp. 8396-8397.

Krupke, et al., "Surface Conductance Induced Dielectrophoresis of Semiconducting Single-Walled Carbon Nanotubes", Nano Lett., 4 (2004), pp. 1395-1399.

Lee, et al., "Extraction of semiconducting CNTs by repeated dielectrophoretic filtering", App. Phys. A, 80 (2005), pp. 5-8.

Lee, et al., "Production of individual suspended single-walled carbon nanotubes using the ac electrophoresis technique", App. Phys. A, 78 (2005), pp. 283-286.

Baik, et al., "Using the Selective Functionalization of Metallic Single-Walled Carbon Nanotubes to Control Dielectrophoretic . . . ", J. Phys. Chem. B, 108 (2004), pp. 15560-15564.

Xu, et al., "Electrophoretic Analysis and Purification of Fluorescent Single-Walled Carbon Nanotube Fragments", J. Am. Chem. Soc., 126 (2004), pp. 12736-12737.

Heller, et al., "Concomitant Length and Diameter Separation of Single-Walled Carbon Nanotubes", J. Am. Chem. Soc., 126 (2004), pp. 14567-14573.

International Search Report mailed Nov. 27, 2008 for international application No. PCT/US2007/063214.

Pohl et al., "Continuous separations of suspensions by nonuniform electric fields in liquid dielectrics", J. Elecrochem. Soc., 1960, vol. 107, No. 5, pp. 390-396.

Kirchoff et al., "Continuous flow dielectrophoresis", J. Elecrochem. Soc., 1973, vol. 120, No. 1, pp. 80-82.

Collins et al., "Engineering carbon nanotubes and nanotube circuits using electrical breakdown", Science, 2001, vol. 292, pp. 706-709.

Strano et al., "Electronic structure control of single-walled carbon nanotube functionalization", Science, 2003, vol. 301, pp. 1519-1522.

Zheng et al., "Structure-based carbon nanotube sorting by sequence-dependent DNA assembly", Science, 2003, vol. 302, pp. 1545-1548.

Dresselhaus et al., "Raman spectroscopy on isolated single wall carbon nanotubes", Carbon 40, 2002, pp. 2043-2061.

* cited by examiner

FLOW DIELECTROPHORETIC SEPARATION OF SINGLE WALL CARBON NANOTUBES

CROSS-REFERENCE TO RELATED APPLICATION

This application claims priority to and benefit of U.S. Provisional Application Ser. No. 60/778,303, filed on Mar. 2, 2006, entitled: "Flow Injection Dielectrophoresis of SWNTs", hereby incorporated herein by reference.

STATEMENT OF GOVERNMENT SPONSORSHIP

The present invention was made with government support under Grant No. NNJO5HE75A, awarded by the National Aeronautics and Space Administration. The government has certain rights in this invention.

FIELD OF THE INVENTION

The present invention relates to separation of single wall carbon nanotubes by one or more of conductivity, diameter, and length using flow dielectrophoresis.

BACKGROUND OF THE INVENTION

Separation of single wall carbon nanotubes (SWNTs) by size and type has become an attractive area because SWNTs with uniform size and type are so desired for applications in future electronic fabrications, biomedical applications and many other applications. Despite continuing investigations, there remains a need for methods for separating single wall carbon nanotubes.

BRIEF DESCRIPTION OF THE INVENTION

According to some embodiments, a method for separating a first fraction of a single wall carbon nanotubes and a second fraction of single wall carbon nanotubes includes, but is not limited to: flowing a solution comprising the nanotubes into a dielectrophoresis chamber; applying a DC voltage, in combination with an AC voltage, to the dielectrophoresis chamber; and collecting a first eluent from the dielectrophoresis chamber, wherein the first eluent comprises the first fraction and is depleted of the second fraction, wherein the first and second fractions differ by at least one of conductivity, diameter, length, and combinations thereof. According to some embodiments, the solution contains a surfactant. According to some other embodiments, the solution may be substantially free of surfactant.

According to some embodiments, the first and second fractions differ by conductivity. For example, the first fraction may contain semiconducting nanotubes and the second fraction may contain metallic nanotubes. The method may further include collecting the second eluent from the dielectrophoresis chamber after the flow. The first fraction may be at least 70% depleted of the metallic nanotubes.

According to some embodiments, the first and second fractions differ by diameter. The second eluent may contain the second fraction. The method may include collecting the second later in time than the first eluent. The single wall carbon nanotubes may be substantially semiconducting. The single wall carbon nanotubes may be substantially metallic. The single wall carbon nanotubes may be a combination of semiconducting and metallic.

According to some embodiments, the first and second fractions differ by length. The second eluent may contain the second fraction. The method may include collecting the second later in time than the first eluent. The single wall carbon nanotubes may be substantially semiconducting. The single wall carbon nanotubes may be substantially metallic. The single wall carbon nanotubes may be a combination of semiconducting and metallic.

According to some embodiments, the first and second fractions differ by length and diameter. The second eluent may contain the second fraction. The method may include collecting the second later in time than the first eluent. The single wall carbon nanotubes may be substantially semiconducting. The single wall carbon nanotubes may be substantially metallic. The single wall carbon nanotubes may be a combination of semiconducting and metallic.

The flow rate may be a suitable flow rate. According to some embodiments, the flow rate is at least 0.02 cc/minute. According to some embodiments, the flow rate is up to about 1 mg/hr. According to some embodiments, the nanotubes are injected into the solution as a pulse. According to some embodiments, the flow is continuous.

The dielectrophoresis chamber may contain a suitable arrangement of electrodes. According to some embodiments, the dielectrophoresis chamber contains interdigitated electrodes adapted for the application of the AC voltage and an opposing plate electrode adapted for the application of the DC voltage. According to some other embodiments, the dielectrophoresis chamber comprises coaxial electrodes adapted for the application of the AC and DC voltages.

According to some embodiments, the degree of separation may be increased by any one or combination of: increasing length of the dielectrophoresis chamber, slowing the flow rate, adding additional dielectrophoresis chambers in series, and increasing the DC voltage. According to some embodiments the geometry of the dielectrophoresis chamber is optimized for increased separation performance.

BRIEF DESCRIPTION OF THE DRAWINGS

The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which.

DETAILED DESCRIPTION OF THE INVENTION

The following examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLES

Example 1

This example illustrates flow dielectrophoretic separation of single wall carbon nanotubes by conductivity, diameter, and type using a dielectrophoresis chamber having interdigitated AC electrodes and a plate DC electrode.

Figure 1:
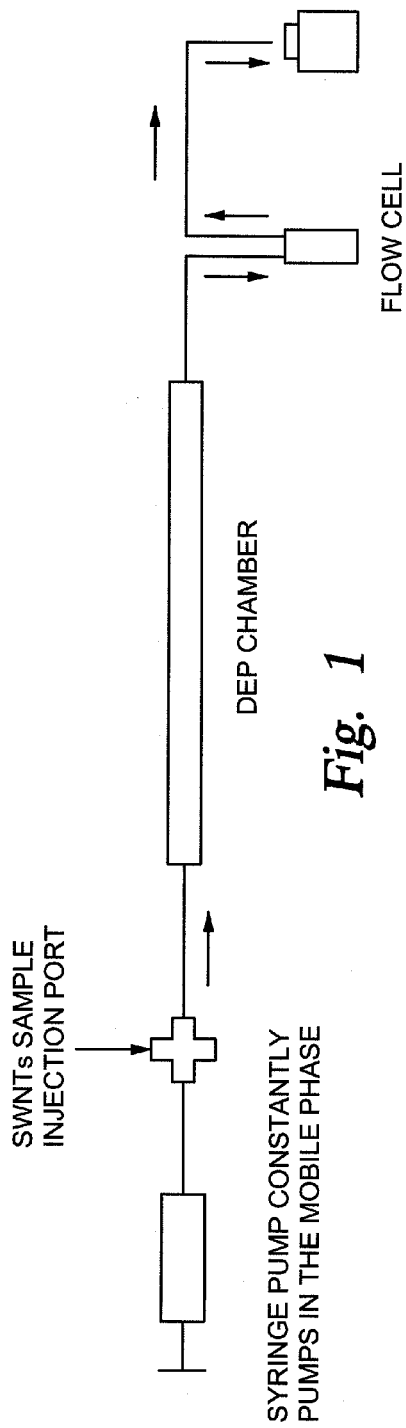
FIG. 1 illustrates a schematic experimental set-up, according to some exemplary embodiments of the present invention.
Figure 2:
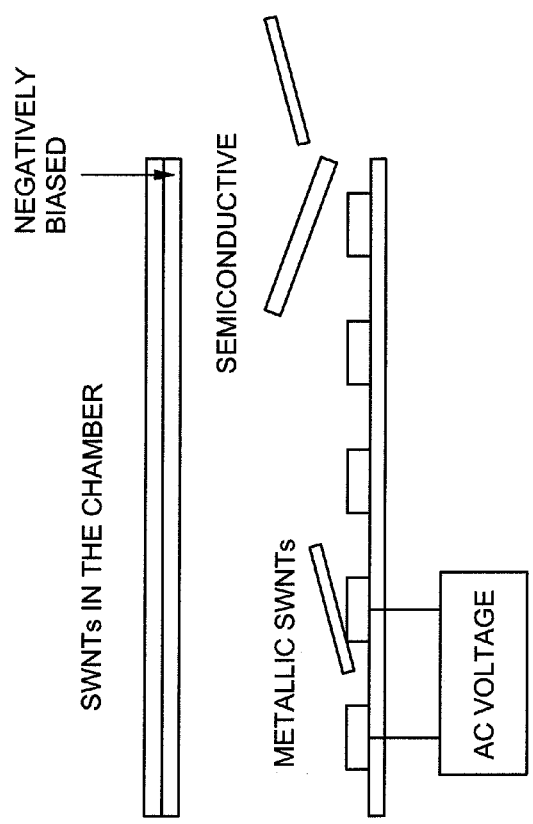
FIG. 2 illustrates a cross-sectional view of a dielectrophoresis chamber having interdigitated AC (alternating current) electrodes, according to some exemplary embodiments of the present invention.
Figure 3:
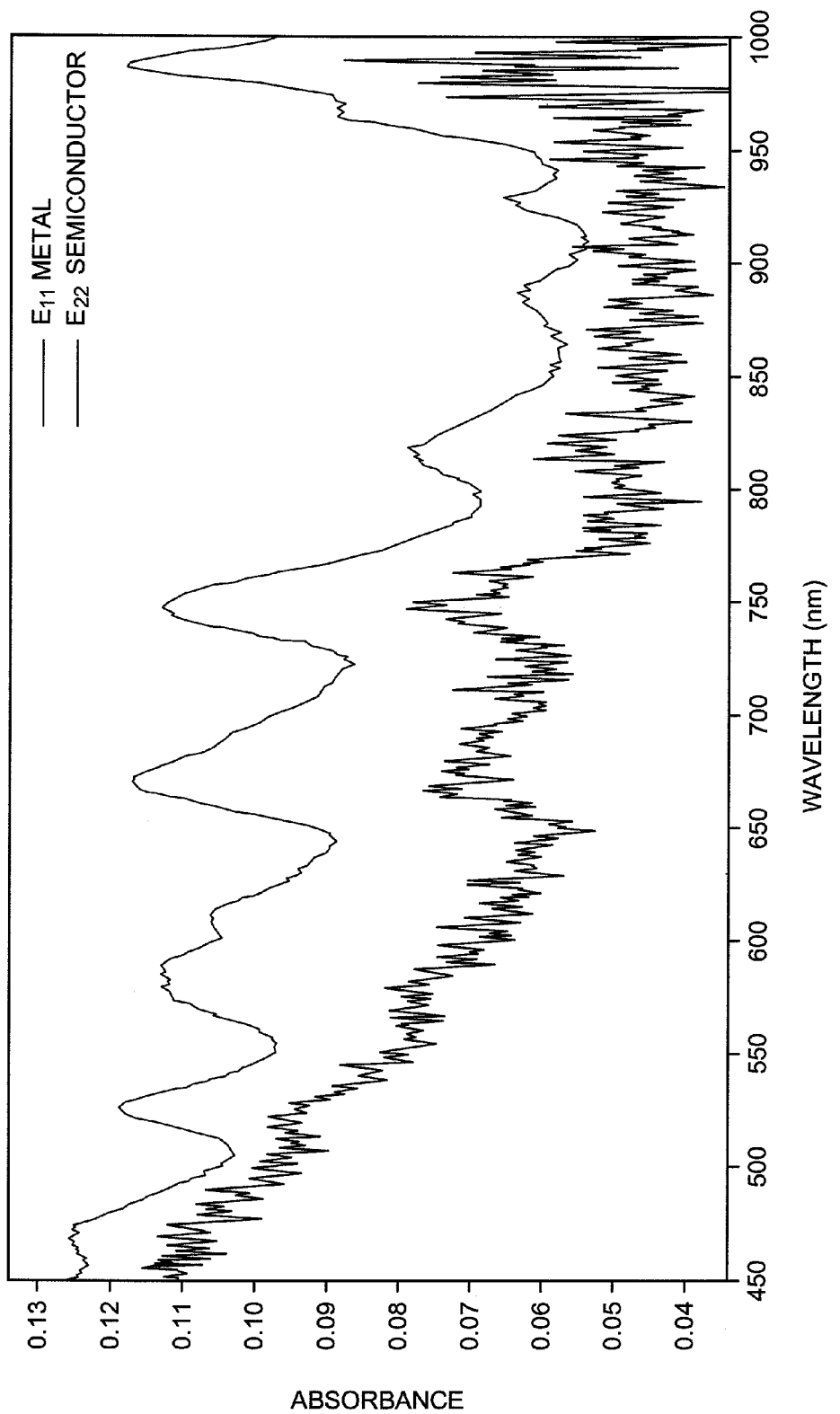
FIG. 3 shows visible absorption spectra collected from starting SWNTs surfactant solution (top curve) and the eluent (bottom), according to some exemplary embodiments.
Figure 4:
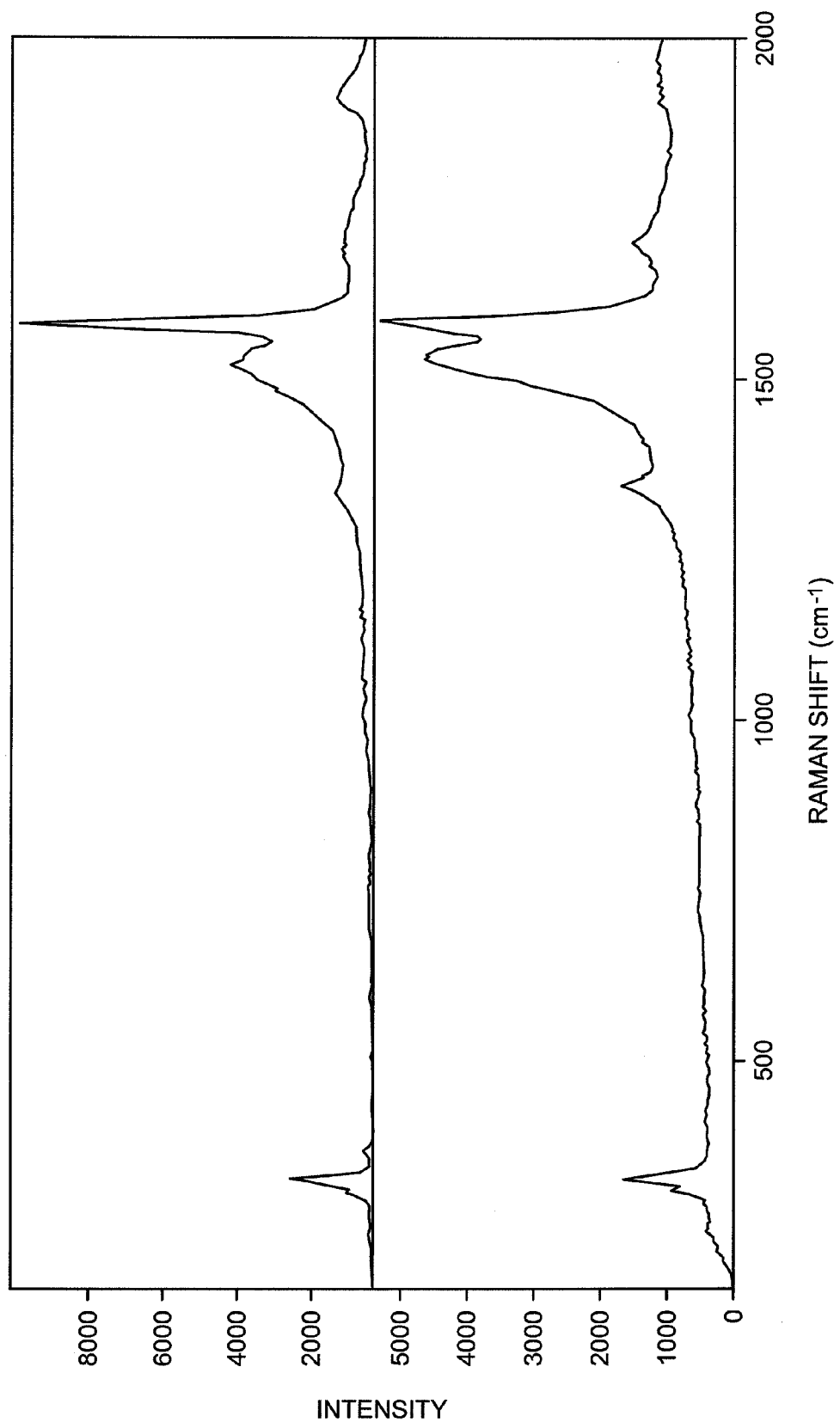
FIG. 4 shows Raman spectra collected from starting SWNTs sample (upper curve) and SWNTs deposited on electrodes in a dielectrophoresis chamber (lower curve), according to some exemplary embodiments.
Figure 5:
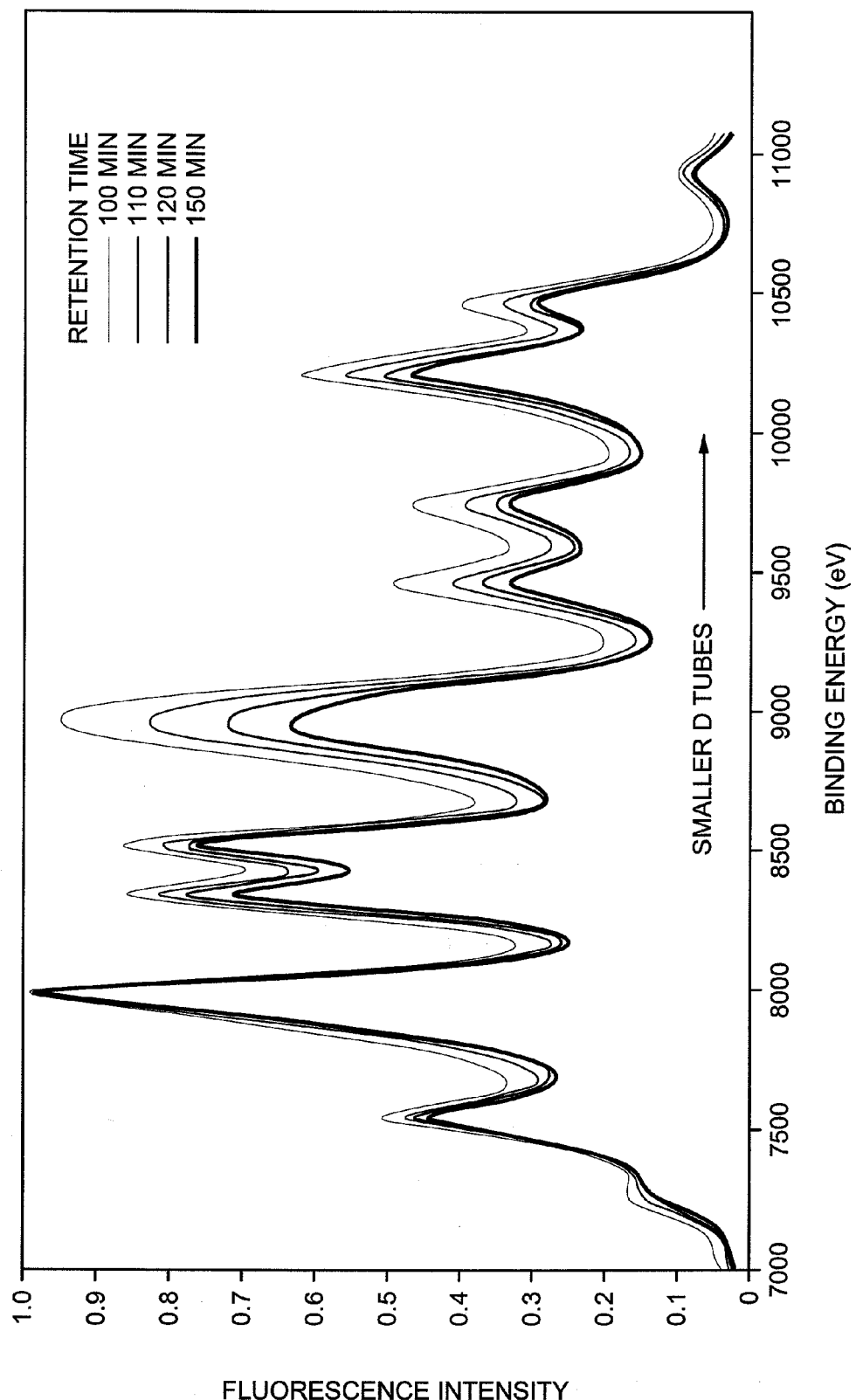
FIG. 5 shows fluorescence spectra collected from eluent at different retention times (100, 110, 120, and 150 minutes, with decreasing peak height for the peak near 9000 cm$^{-1}$) with a 785 nm laser excitation, according to some exemplary embodiments.

FIGS. 1-5 illustrate this example. FIG. 1 shows syringe pump 120 constantly pumping in the mobile phase, SWNT sample injection port 130, DEP chamber 140, flow cell 150, and collection vessel 160. FIG. 2 shows a view of SWNTs in an interdigitated embodiment of a DEP chamber. Plate electrode 210 is negatively biased. AC voltage is applied to AC electrodes 220. Metallic SWNTs 230 tend to remain in the chamber, flowing more slowly, or sticking to electrodes 220. Semiconductive SWNTs 240 tend to flow more quickly and elute from the chamber. Typical experiment conditions were: Chamber Volume: ~1.75 CC; flow rate: 0.02 cc/min; 1 MHz, 10 V peak-to peak. FIG. 3 shows visible absorption spectra collected from starting SWNTs surfactant solution (top spectrum 310) and the eluent (bottom spectrum 320. FIG. 4 shows Raman spectra collected from starting SWNTs sample (upper spectrum 410) and SWNTs deposited on electrodes in a dielectrophoresis chamber (lower spectrum 420. FIG. 5 shows fluorescence spectra collected from eluent at different retention times (spectrum 510 corresponding to 100 minutes, spectrum 520 corresponding to 110 minutes, spectrum 530 corresponding to 120 minutes, and spectrum 540 corresponding to 150 minutes) with a 785 nm laser excitation.

SWNTs from the well-known HiPco process were used to prepare the sample solution. As produced SWNTs from HiPco process in the Carbon Nanotechnology lab, Rice University have more than 30 (n, m) types (Bachilo, S. M.; Strano, M. S.; Kittrell, C.; Hauge, R. H.; Smalley, R. E.; Weisman R. B.; *Science,* 2002, 298, 2361-2366). Theoretically, one third of the SWNTs is metallic and two third are semi-conductive. From band-gap fluorescence analysis, it has been determined that the diameter of semi-conductive SWNTs ranges from 0.6 to 1.4 nm (Bachilo, S. M.; Strano, M. S.; Kittrell, C., Hauge, R. H.; Smalley, R. E.; Weisman R. B.; *Science,* 2002, 298, 2361-2366).

The sample solution contained 150 µL SWNTs in 1% sodium dodecyl benzene sulfonate (SDBS) decanted solution. The sample solution preparation procedure, involving homogenization, ultra-sonication, centrifuge and decantation, was described in a previous publication (M. J. O'Connell, S. M. Bachilo, C. B. Huffman, V. C. Moore, M. S. Strano, E. H. Haroz, K. L. Rialon, P. J. Boul, W. H. Noon, J. Ma, R. H. Hauge, R. B. Weisman and R. E. Smalley. *Science,* 2002, 297, 593.) This sample solution preparation procedure is conventional and known to one of ordinary skill in the art.

The study presented in this example involved using flow injection dielectrophoresis technique with a modified dielectrophoresis device purchased from Adeptas Inc. The length, width and height of the modified dielectrophoresis chamber are 28, 2.5 and 0.025 cm respectively. On the bottom of the chamber, there are two arrays of 50 µm wide, 2 µm thick gold electrodes. The electrodes of the two arrays, connected to an AC voltage generator, are alternatively arranged thus every electrode is adjacent to two electrodes of the opposite polar. As part of the modification, there is an additional plate electrode on the top of the chamber that is negatively biased. This permitted the application of a DC voltage in combination with the AC voltage.

In a typical operation, a syringe pump constantly pumped the mobile phase, 1% SDBS solution, into the chamber. SDBS is an exemplary surfactant. The frequency and voltage were set to 1 MHz and 10 V peak-to-peak voltage respectively. The SWNT solution was injected to the mobile phase through a septum near the entrance of the chamber. The flow rate of the mobile phase was set to 0.02 cc/min. The injected SWNTs sample flowed through the chamber before it was led into a fluorescence flow through cell and collected for further analysis. The flow through cell has three windows, thus it allows the NanoSpectralyzer fluorometer (purchased from Applied NanoFluorescence, LLC) to collect fluorescence spectrum and visible absorption spectrum simultaneously.

In this study, online visible absorption spectrum of the eluent were collected to study the relativity between the first van Hove transition of metallic SWNTs, from 440 to 645 nm wavelengths, and the second van Hove transition of semi-conductive SWNTs, from 600 to 800 mm wavelengths. FIG. 3 shows a typical visible absorption spectrum collected in an experiment when the absorbance intensity peaked. By integrating the peak areas assigned to metallic and semi-conductive SWNTs, it was found that in the eluent, the metallic tubes were approximately 70% depleted compared with the SWNT material we started with. The noise level rose due to the dilution effect from the mobile phase.

Raman spectra, shown in FIG. 4, were collected from the SWNTs deposited on the electrodes after the experiment was finished to compare with the spectrum collected from the starting SWNT material. A significant enhancement of the G$^-$ band was observed centered at 1532 cm$^{-1}$ relative to G$^+$ band centered at 1592 cm$^{-1}$ from the SWNTs deposited on the micro-size electrodes. The enhanced G$^-$ band, which is a broad breit-Wigner-Fano line, is strong evidence that metallic SWNTs are selectively deposited on the electrodes. However, besides being deposited on the electrodes, some metallic SWNTs may have also been diluted in the mobile phase in the tail trace and were not detected by visible absorption.

Band-gap fluorescence was utilized to study the correlation between the band-gap of semi-conductive SWNTs and its retention time. FIG. 5 shows the fluorescence spectra obtained from different retention times during the experiment. The fluorescence emission was obtained with a 785 nm laser as the excitation and the peak centered at 7936 cm$^{-1}$ was normalized. The fluorescence emission peaks ($E_{11}$) at higher frequency (cm$^{-1}$), which were assigned to emission of larger band-gap SWNTs, became weaker with growing retention time, which indicates that they are selectively depleted in the eluent. The band-gap of semi-conductive SWNTs is inversely proportional to its diameter (Wildoer, J. W.; Venema, L. C.; Rinzler, A. G.; Smalley, R. E.; Dekker, C. *Nature* 1998, 391, 59.) Thus, FIG. 5 demonstrates separation by diameter.

Larger diameter semi-conductive SWNTs, with smaller band-gap, theoretically should have greater dielectric constants. The difference in dielectric constants could lead to the difference in the dielectrophoresis force. Thus, the vertical position of the semi-conductive SWNTs in the flow inside the chamber could be different for semi-conductive SWNTs with different diameters, i.e. the larger diameter SWNTs are closer to the bottom. In a laminar flow, the velocity of particles is height dependent, i.e., the middle stream flow faster. The present inventors believe under the experimental conditions, the smaller diameter semi-conductive SWNTs flow faster because its vertical position is higher that of larger diameter SWNTs and this technique has a great potential to lead to a complete diameter separation.

The present inventors found that the top plate electrode, which is negatively biased, plays a role in obtaining the results seen in the experiments. The dielectric constants of semi-conductive SWNTs are believed to be smaller than that of media thus the dielectrophoresis force would be repulsive. A recent study (Kim, Y.; Hong, S,; Jung, S.; Strano, M. S.; Choi, J.; Baik, S.; *Journal of Physical Chemistry B*, 2006, 110, 1541) suggested that the force exerted on semi-conductive SWNTs could be positive force when the AC frequency is larger than 10 MHz depending on the induced surface conductance from ionic surfactants. The present inventors believe that the negatively biased top electrode help to suppress the SWNTs migrating to the bottom due to the negatively charged groups of the surfactants. The present inventors did not observe the same separation when a nonionic surfactant was used.

By using flow injection dielectrophoresis, the present inventors not only observed the separation of metallic and semi-conductive SWNTs, but also observed the indications of separation of semi-conductive SWNTs with different diameters.

Separation by length was also observed from images of early, middle, and late eluent. From a visual examination of the images, early eluent nanotubes were about 0.5 microns, middle eluent nanotubes were about 1.25 micron, and late eluent nanotubes were about 2 microns.

The technique described in this example has a potential to be useful as an analytical tool and could also be scaled up for separation of larger quantity SWNTs.

While this example and the one that follow make use of a surfactant in the solution it will be understood that the nanotubes containing solution that is introduced to the chamber may be substantially free of surfactant. Surfactant free nanotube solutions are known and are commercially available from Brewer Scientific.

Example 2

This example illustrates computer calculations of flow dielectrophoretic separation of single wall carbon nanotubes by type using a dielectrophoresis chamber having coaxial electrodes.

Figure 6:
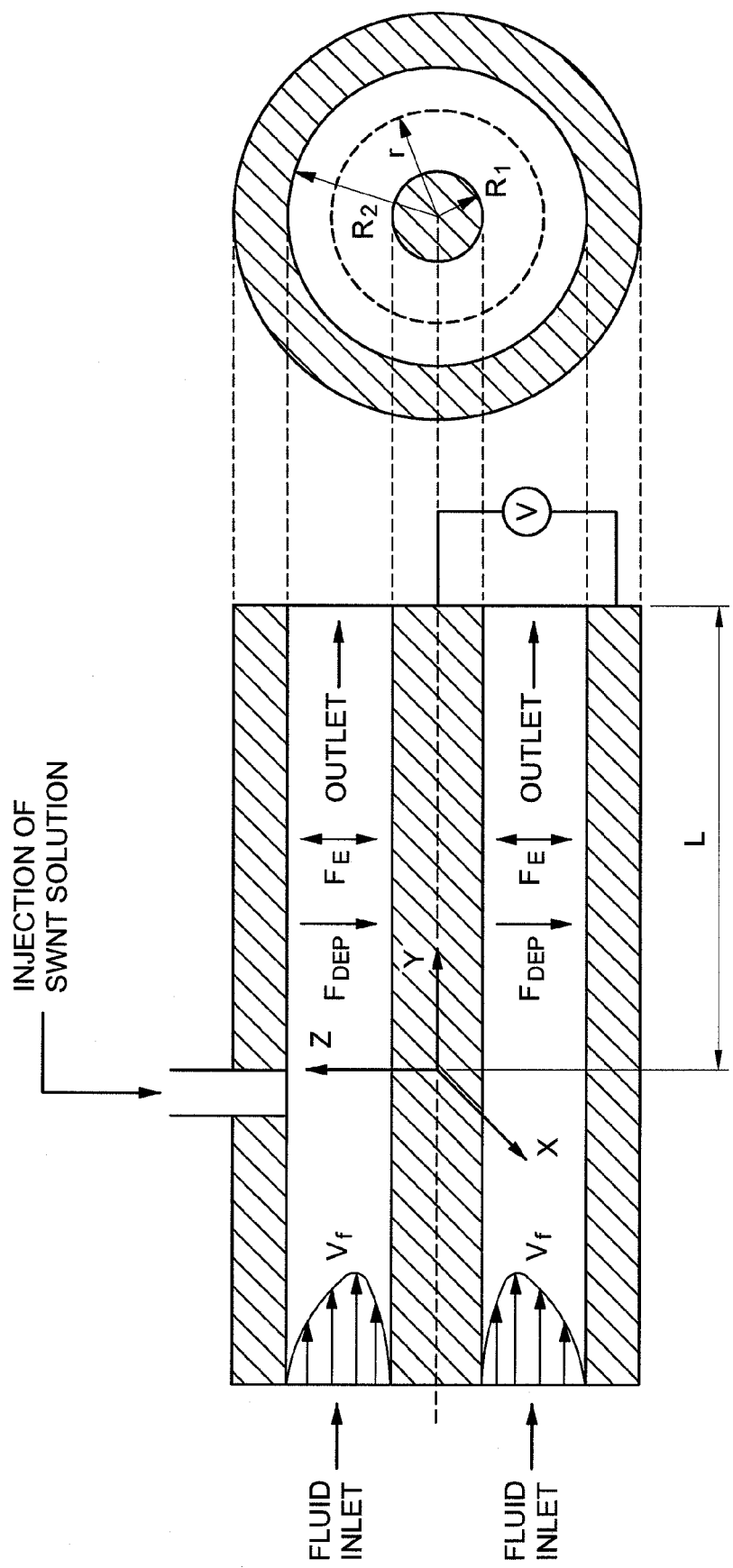
FIG. 6 illustrates a dielectrophoresis chamber having coaxial electrodes, according to some exemplary embodiments.

FIG. 6 illustrates this example. FIG. 6 shows a sketch of the separation device used for metallic vs. semiconductor separation. The dilute SWNT solution is injected at a point $R_i=0.9R_2$ on the top of the hollow cylindrical tube. The small injection tube should be composed of an insulating material, like a typical microtubing sleeve. Dielectrophoretic (DEP) and Electrophoretic (EP) forces can be generated inside the flow region using an AC voltage with a DC offset. The objective is to collect the majority of metallic SWNTs in the inner wire and let the semiconductors remain in the flow.

The present inventors developed an efficient SWNT separation device where dispersed nanotubes flow between two coaxial cylinders subjected to an AC voltage difference with a DC offset. The DC offset exerts an electrophoretic force on the charged surfactants that stabilize the SWNTs in water. This drags the wrapped SWNTs near the inner cylindrical electrode where the dielectrophoretic force, caused by the AC field, is higher. Because of the simple geometry, the velocity profile and the electric fields can be described analytically. The present inventors used Brownian dynamics to simulate dilute suspensions of SWNTs and predict the motion of both metallic and semiconducting tubes under the action of the fluid flow, both electric forces, and the random Brownian force.

Further, the present inventors developed a Nelder and Mead optimization algorithm that numerically searches for the optimal device conditions that produce a global maximum in the separation performance, for suitable type of SWNT or solution parameters. It is demonstrated that a 99.1% performance is possible to be achieved with typical SWNT and material device parameters.

DEP Separation Device

For this study the present inventors consider a separation device which consists of a coaxial cylindrical channel composed of an outer hollow metallic tube and an inner metallic wire that is stretched along the cylinder axis, as depicted in FIG. 6.

The solvent fluid flows in the space between the inner wire and the hollow cylinder, in a time independent regime, and a voltage is applied between them to generate the electric field within the flow region. The SWNT solution is injected close to the cylinder internal wall at $R_2$, and then nanotubes undergo translational and rotational motion driven by the electric, hydrodynamic and Brownian forces and torques. The SWNTs solution inlet should be as small as possible so that all particles can be started at the same position (usually called focusing). This focusing technique has proven to be very useful for many types of particle separation processes, since it reduces the dispersion peaks of the separated species and therefore increases the sorting efficiency.

The starting distance $R_i$ from the cylinder axis is going to depend on the ratio between the main flow Q and the injection flow $Q_{inj}$. As described in Appendix A, for $Q/Q_{inj} \cong 100$ it is a good approximation to consider that all SWNTs initiate their motion at a single injection point at $R_i=0.9 R_2$.

If a pure AC voltage is applied there will be only a DEP force, in the negative radial direction, that scales as $F^{DEP} \alpha V_{AC}^2/r^3$, where $V_{AC}$ is the AC voltage and r is the distance to the cylinder axis. In the case of the rectangular separation channel with an interdigitated electrode array on the bottom [17, 22], such as the one built by H. Peng and coworkers [20], the DEP force also scales with $V_{AC}^2/r^3$ but there are regions between the electrodes where it vanishes. With this cylindrical geometry $F^{DEP}$ is always greater than zero everywhere inside the flow region. Furthermore, the flow and electric fields can be analytically determined at every point within that region with no need for geometrical approximations besides the assumption that the channel length L is much higher than $R_2$.

Fluid and SWNT Physical Parameters

Before calculating the optimal values for the channel dimensions, applied voltages and fluid flow, the present inventors will present the physical quantities assumed for our materials. Table I shows the values assumed for the solvent medium, which is considered to be water with a small percentage of surfactant salt.

TABLE I

Fluid Parameters.

| | |
|---|---|
| Temperature (T) | 300 K |
| Dynamic Viscosity (v) | $1 \times 10^{-3}$ Kgm$^{-1}$s$^{-1}$ |
| Permittivity ($\epsilon_m$) | 80 $\epsilon_0$ |
| Conductivity ($\sigma_m$) | $1 \times 10^{-3}$ S/m |

$\epsilon_0$ = vacuum permittivity

Operational Conditions

To calculate the parameters concerning channel dimensions, applied voltage and fluid flow, the present inventors will start by looking at the positive DEP motion of metallic tubes with a length equal to the peak length $l^P$ of a Weibull distribution $W(l)$ for SWNT length l. The parameters assumed for the distribution are: $a=6\times10^{-6}$, $b=2.29$, $l_{min}=250$ nm. These values yield a peak probability length at $l^P=400$ nm.

First of all, since the DEP force scales with $1/r^3$, the lower is the channel radius $R_2$ the higher will be the DEP effect in the fluid flow region. On the other hand, the radial distance inside the channel is much higher than the SWNTs dimensions or else they couldn't be viewed as point particles by the field gradient. Therefore, a possible choice for $R_2$ is to set it three orders of magnitude higher than the typical SWNT length:

$$\frac{R_2}{l^P} = 10^3 \tag{1}$$

Secondly, it is desirable that the metallic tubes align with the electric field direction everywhere inside the channel, and the semiconductors do not. So the metals rotational electric energy for AC field alignment $U_R^{DEP}$ should be at least one order of magnitude higher than the thermal Brownian energy:

$$\frac{U_R^{DEP}}{K_B T} = 10 \tag{2}$$

Thirdly, the present inventors impose the condition that the translational DEP motion for a metallic SWNT aligned with the field lines to go from $R_2$ to $R_1$ is 10 times faster that the Brownian diffusion motion for it to travel the same distance:

$$\frac{T^{DEP}(R_2 \to R_1)}{T^{BM}(R_2 \to R_1)} = 0.1 \tag{3}$$

$T^{DEP}(R_2 \to R_1)$ is the analytically calculated transit time for an aligned metallic SWNT with $l_{NT}=l^P$ to cross the channel radially with just the DEP and viscous force $$\left(F_{DEP}^{\parallel}(r) = \zeta^{\parallel}\frac{dr}{dt}\right).$$

$T_{BM}(R_2 \to R_1)$ is the Brownian time to diffuse a distance $d=R_2-R_1$, obtained with the Einstein diffusion equation: $d^2=6Dt$.

The dimensionless ratios (1), (2) and (3) give us a set of three equations that can be solved for the three unknowns: $R_1$, $R_2$ and $V_{AC}$. Using these values we also assure a DEP-driven translational motion for metallic tubes since the DEP potential energy difference between $R_2$ and $R_1$ ($\Delta U_T^{DEP}$) is much higher than the thermal energy:

$$\frac{\Delta U_T^{DEP}}{\frac{3}{2}K_B T} \cong 70 \tag{4}$$

Knowing the channel radial dimensions $R_1$ and $R_2$ we can now calculate a possible volume flow Q to use. This flow is desirably low enough in order for the tubes not to orient with its direction. Therefore, the present inventors impose the condition that the maximum rotational Peclet number inside the channel (at the wire wall $r=R_1$) is much less than unity:

$$Pe(R_1) = \frac{\dot{\gamma}(R_1)}{D^R} = 0.01 \tag{5}$$

where $$\dot{\gamma}(R) = \left.\frac{\partial v f}{\partial r}\right|_R$$

is the shear rate, which is proportional to Q.

The dimensionless ratios shown in this section yield the values in table II, for our particular SWNT and fluid parameters listed with regards to fluid and SWNT physical parameters. It is worth pointing out that the values shown in the table can easily be recalculated for any other SWNT length distribution or material dielectric constants to satisfy the device conditions set by the dimensionless quantities in (1), (2), (3) and (5).

TABLE II

Operational conditions for DEP separation, using the fluid and SWNT parameters listed with regards to fluid and SWNT physical parameters, and determined by eqs. (1), (2), (3) and (5)

| | |
|---|---|
| $R_1$ | 118.25 μm |
| $R_2$ | 400 μm |
| $V_{AC}$ | 79.3 V |
| Q | 2.73 μl/min |

Brownian Dynamics Simulation Conditions

The Brownian dynamics code was written in Fortran 90 using Message Passing Interface (MPI) for parallel computation on distributed memory systems (typically 20-100 processors). Rice ADA Cray cluster was the computational environment used to run the programs. It is a 632 AMD64 CPU core machine with dual core CPUs and Rapid Array Interconnect. Each CPU is a 2.2 GHz AMD Opteron with 1 MB L2 cache.

Every simulation was performed using 9000 SWNTs from which 3000 are metallic and 6000 are semiconductors, to mimic equidistribution of SWNT chiralities (n,m). This is statistically a sufficiently high number of particles for all the calculations.

The time step used is $\Delta t$ 10 µs, which is inferior to the maximum time step allowed for the integration of a metallic tube rotational motion with the conditions shown in Table II:

$$\Delta t < \frac{\zeta^R}{M_M^{AC}(R_1)} = 15.3 \text{ µs} \tag{6}$$

Boundary Conditions—Sticky Walls: Once a SWNT reaches the cylindrical walls at $R_1$ or $R_2$ it remains fixed at that final position and the calculations terminate for that particle.

Initial Conditions: All SWNTs start at the single injection point, illustrated in FIG. 6, with zero velocity and a random orientation u.

Separation with Dielectrophoresis (DEP) and Electrophoresis (EP)

An EP force $F^E$ can be added to the DEP force by including a certain DC offset $V^{DC}$ in the AC voltage. This force is proportional to the net charge on the nanotubes $q_{NT}$ and to the DC electric field $E^{DC}$ generated by the offset voltage:

$$F^E(r) = q_{NT} E^{DC}(r) = \frac{q_{NT} V^{DC}}{\ln[R_2/R_1]} \frac{\hat{r}}{r} \tag{7}$$

The SWNTs net negative charge comes from the polar surfactant molecules that are wrapped around their external surface. Therefore, the EP force acts equally on metallic and semiconducting tubes considering that there is no type selective attachment between the surfactants and SWNTs.

Using a sufficiently high EP force to overcome thermal Brownian motion, but low enough to be inferior to the DEP force on metals everywhere inside the channel, we can increase considerably the amount of semiconductors that remain in the flow region. For that purpose, the DC positive electrode has to be applied to the inner wire, so that $F^E$ points in the negative radial direction (like $F^{DEP}$). This mainly prevents the semiconducting SWNTs from diffusing to the outer wall at $R_2$, forcing them to remain dispersed in solution, and therefore increasing the output yield Y considerably.

The value of $q_{NT}$ for a certain tube will clearly depend on the type of surfactant being used. Besides, it is expected to be proportional to the nanotube length $l_{NT}$, assuming a fixed diameter for all SWNTs. Therefore, the product $q_{NT} V^{DC}$ in (29) shall henceforth be treated as a single variable which obeys:

$$q_{NT} V^{DC} = C_q l_{NT} \tag{8}$$

where the constant of proportionality $C_q$ is determined using the following condition for a metallic SWNT with $l_{NT} = l^P$:

$$\frac{F_M^{DEP}(R_2)}{F^E(R_2)} = 1 \tag{9}$$

Since $F^{DEP}$ scales with $1/r^3$ and $F^E$ scales with $1/r$, the ratio (9) ensures that the DEP force on metals is always higher than the EP force, everywhere inside the flow region. Therefore, the addition of electrophoresis shouldn't reduce the separation efficiency of the device because dielectrophoresis is still the dominant effect that determines the SWNT radial motion.

As an example, if the total charge on a certain nanotube is $q_{NT} = 1 \times 10^{-17}$ C then the DC voltage to use is $V^{DC} = 10$ mV, for the conditions referred in section VI. So $V^{DC}$ is about 3 orders of magnitude lower that the $V^{AC}$ value given in Table II. Hence, the extremely small DEP force generated by the nonuniform $E^{DC}$ bias field can safely be neglected.

Nelder and Mead Optimization Algorithm

Conditions referred to above with respect to operational conditions, together with the optimal channel length calculated in the previous section, enable us to achieve a performance of about 83% for $S_{MS}=10$. However, these conditions can now be tuned to improve our sorting even more.

To find the overall maximum performance P that can be achieved by our system the present inventors will make use of a multidimensional direct search algorithm known to one of ordinary skill in the art as the Nelder and Mead or Downhill Simplex method. This method has found widespread use in the optimization of nonlinear functions whose gradient is very expensive (or even impossible) to calculate. It has also been shown to work quite well for stochastic problems, like in our case where we which to find the set of six parameters: $X_{Max} = \{R_2, R_1, V_{AC}, V_{DC}, L, Q\}$ that maximize the stochastic performance function P(X). These six quantities can be treated as the coordinates of a six-dimensional space where P(X) is defined.

The essence of the Nelder and Mead technique for maximizing (or minimizing) a function with n variables is to pick n+1 starting points, forming a n-simplex (a n-dimensional analogue of a triangle), at which the function is evaluated for all of them; then it iteratively moves and re-dimensions the simplex along the coordinates space as better points are found, until some desired bound is obtained.

It is important that we restrict the values of each variable to a certain allowed range, so that we do not waste computational time searching for the P maximum in regions where a priori is known that the performance is going to be zero or extremely low. With this algorithm it is quite easy to keep the searching direction inside our chosen domain, the maximizing function is set equal to a very undesirable value at any point that falls out of the allowed region. That way it is very unlikely that that point will be considered for the new simplex in the next iteration.

For each coordinate in our six-dimensional space we specify a lower and upper boundary condition. Thus, the present inventors use at least 12 inequations to fully define our points domain. These inequations are listed below:

Lower Limits:
$R_2$—The channel radius is much higher than the typical SWNT length: $R_2 > 100 \, l_{NT}^P$
$R_1$—Since the metallic tubes accumulate in the inner wire, its perimeter is at least one order of magnitude higher than the typical SWNT length: $R_1 > 10 \, l_{NT}^P$ $V_{AC}$—The metallic SWNTs rotational motion is DEP driven: $U_R^{DEP}(R_2) > K_B T$.

$V_{DC}$—The SWNTs electrophoretic translational motion overcome thermal Brownian fluctuations: $\Delta U_T^E > \frac{3}{2} K_B T$ L—The cylinder has a high aspect ratio in order to neglect the effects of its ends in the electric and hydrodynamic fields established inside: $L > 10 R_2$ Q—There is no defined physical lower limit for the main flow (Q). It should be as high as possible since the higher is Q the higher can also be the injection flow ($Q_{inj}$), and therefore the SWNT mass output. The reason for this is explained in Appendix A.

Upper Limits:

$R_2$—The metallic SWNTs translational motion are DEP driven: $\Delta U_T^{DEP} > \frac{3}{2} K_B T$ $R_2$—It is clear that, $R_1 < R_2$ $V_{AC}$—For practical purposes, to avoid excessive heating and security concerns, this voltage should be kept as low as possible. Therefore, we set a 200 V upper limit for $V_{AC}$.

$V_{DC}$—In the metallic tubes motion, DEP force are dominant over the EP force: $F_M^{DEP}(R_2) > F^E(R_2)$ L—The time it takes for a tube at the mean flow velocity ($\overline{v}_F$) to travel the distance L should remain lower than the Brownian diffusion time to cross the channel radially: $T_{BM}(R_2 \to R_1) > T_{\overline{v}_F}(0 \to L)$ Q—First of all, the shear flow torque cannot be higher than the DEP torque on metallic tubes: $M_H(R_2) < M_{DEP}(R_2)$. Secondly, the flow is laminar, therefore its Reynolds number satisfies: $Re(Q) < 1000$.

The search for the global performance maximum $P(X_{Max})$, within the six-dimensional domain defined by these 12 conditions, can be made substantially faster with a good choice of the initial seven-point simplex. This initial simplex is non-degenerate, i.e., its 6D volume cannot be zero, and it should cover a significant portion of the total domain volume. Therefore, six of the initial simplex vertices were set close to different domain boundaries. The seventh point was set with predetermined parameters obtained from a dimensionless ratio expression. These previously calculated parameters constitute a good initial guess for our searching direction, which cause the simplex to shrink, in the first iterations, towards the seventh point. Afterwards it reflects and expands towards regions of higher performance points until it shrinks to a single point $X_{Max}$ at the peak performance found.

For every iteration we consider a separation ratio $S_{MS}=10$. The present inventors choose to perform the optimization with this $S_{MS}$ because the present inventors do not expect significant differences in the separation performances of higher $S_{MS}$ values.

At every simplex vertex X analyzed a simulation is run with 2000 metallic tubes and 4000 semiconductors, all of them initiated at a single injection point $R_i=0.9R_2$. It is shown in Appendix A that if $R_i=G(0.5)$ this assumption only introduces a small discrepancy of about 0.06 in the calculated P. A different time step is used for each simulation point since there will be distinct torque magnitudes involved in the SWNTs' rotational motion. So for every run the maximum torque magnitude is first determined and then the time step is obtained accordingly.

Given these considerations, the algorithm is able to reach a maximum within 60 iterations. However, generally this is a local maximum in the searching domain. To find the global performance maximum, the Nelder and Mead program was sequentially run with different initial seven-points sets that included the previously obtained local maximums. Finally the algorithm reached the desired peak performance at the point shown in Table III where there is almost total collection of metallic tubes and none of semiconductors.

It is interesting to observe that the optimization algorithm immediately converges to points with flow magnitudes Q much higher than the one initially used, which was given by expression (5). Flows with the order of magnitude of the one in Table III originate a high shear torque on the SWNTs located next to the cylinder walls. This shear will make the semiconducting SWNTs align with the flow, but it is still low enough to not exceed the DEP torque on metals. Since the semiconductors DEP response is even lower when they are forced to remain perpendicular to the field lines, that makes the performance increase with higher flow rates.

TABLE III

Optimal operational conditions for DEP separation calculated by the Nelder and Mead direct search algorithm.

| | |
|---|---|
| $R_1$ | 79 μm |
| $R_2$ | 235 μm |
| $V_{AC}$ | 143.7 V |
| $V_{DC}$ | 9.86 mV |
| L | 1.12 m |
| Q | 0.958 ml/min |
| Performance | .991 |

With these parameters there is almost total metallic vs. semi-conducting SWNT separation with a minimal $S_{MS}=10$.

Another advantage of using higher Q is that it enables a better mass output of separated SWNTs. The higher is this main flow the higher can also be the injection flow $Q_{inj}$, and therefore the more SWNT solution volume is injected per unit time. For any set of device parameters, Q can always be increased without reducing the performance if L is also proportionally increased (as long as the upper limits previously specified in this section are not exceeded).

Remarks

The possibility of total metallic vs. semiconductor SWNT separation has been demonstrated using DEP-FFF with a coaxial device geometry, as long as there is at least one order of magnitude difference between the DEP force on metals and the one on semiconductors.

A set of device conditions may be obtained for any type of material parameters (SWNT length distribution, SWNT and solvent medium permittivities and conductivities, etc.). These conditions constitute a good initial guess for the following calculations performed with the optimization direct search algorithm, which outputs the best conditions set for any given parameters.

The use of the Nelder and Mead method is strongly recommended for these type of computational problems whose aim is to maximize nonlinear functions of n real variables using only function values, without any derivative information (explicit or implicit). For the particular SWNT and solvent medium parameters considered in this article, the optimization algorithm was able to achieve a set of six device conditions where practically all metallic SWNTs were collected and all semiconductors remained in solution (99.1% performance). Even better sorting can be obtained if the SWNT Weibull length distributed is narrower. One way of achieving this would be by using carpet grown SWNTs instead of HiPco generated.

In what concerns the SWNT mass output of separated nanotubes, this is mainly controlled by the injection flow rate ($Q_{inj}$). The present inventors have determined that the ratio between the main and the injection flow is desirably kept at $Q/Q_{inj}=100$. Further, the inlet Reynolds number is desirably small ($Re^{inj} \leq 10$), which means that for a given $Q_{inj}$ there is a minimum $R_{inj}$ for the inlet pipe radius. Hence, if Q≈1 ml/min (as shown in table III) then $Q_{inj}$=10 μl/min and $R_{inj}$>10.6 μm. Considering that the internal cylinder wall perimeter is $2\pi R_2 \cong 1.48$ mm it should be possible to include 10 flow entrances equally spaced around the cylinder wall, using inlet radius close to $R_{inj}$. If a SWNT solution concentration of 150 mg/L is continuously injected in the 10 inlets at y=0 then the semiconducting SWNTs mass coming out of the device at y=L should be 0.015 mg/min.

After the semiconducting SWNTs' collection, the process of gathering all the metals remaining at the inner wire is much faster. Firstly, the SWNT solution injection is stopped and the AC voltage is turned off. Afterwards, the DC voltage is inverted so that an opposite EP force helps to pull the metallic SWNTs out of the wire and disperse again in solution. The main flow Q will then drag the metallic SWNTs to y=L where they are collected in a separate bottle.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method for separating a first fraction of single wall carbon nanotubes and a second fraction of single wall carbon nanotubes, the method comprising:
   laminarly flowing a solution comprising the first fraction and the second fraction of single wall carbon nanotubes and an ionic surfactant into a dielectrophoresis chamber; providing, within the dielectrophoresis chamber, at least one DC electrode and at least two AC electrodes, wherein the DC electrode and the AC electrodes are positioned on opposing walls of the dielectrophoresis chamber;
   applying a DC voltage to said DC electrode with a negative electrode bias, in combination with application of an AC voltage through the AC electrodes, within the dielectrophoresis chamber; and
   collecting a first eluent from the dielectrophoresis chamber, wherein the first eluent comprises the first fraction of single wall carbon nanotubes and is depleted of the second fraction of single wall carbon nanotubes, wherein the first fraction and the second fraction differ by conductivity and at least one of diameter, length, and combinations thereof.

2. The method according to claim 1, wherein the first fraction comprises semiconducting nanotubes and the second fraction comprises metallic nanotubes.

3. The method according to claim 2, wherein the method further comprises collecting the second eluent from the dielectrophoresis chamber after the flow.

4. The method according to claim 2, wherein the first fraction is at least 70% depleted of the metallic nanotubes.

5. The method according to claim 4, wherein a second eluent comprises the second fraction, and wherein the method further comprises collecting the second eluent later in time than the first eluent.

6. The method according to claim 1, wherein the single wall carbon nanotubes are substantially semiconducting.

7. The method according to claim 1, wherein the single wall carbon nanotubes are substantially metallic.

8. The method according to claim 1, wherein the flow rate is at least 0.02 cc/minute.

9. The method according to claim 1, wherein the dielectrophoresis chamber comprises interdigitated electrodes adapted for the application of the AC voltage and an opposing plate electrode adapted for the application of the DC voltage.

10. The method according to claim 1, wherein the dielectrophoresis chamber comprises coaxial electrodes adapted for the application of the AC and DC voltages.

11. A method for separating semiconducting single wall carbon nanotubes and metallic single wall carbon nanotubes, the method comprising:
   laminarly flowing a solution comprising the semiconducting and the metallic single wall carbon nanotubes and an ionic surfactant into a dielectrophoresis chamber; providing, within the dielectrophoresis chamber, at least one DC electrode and at least two AC electrodes, wherein the DC electrode and the AC electrodes are positioned on opposing walls of the dielectrophoresis chamber;
   applying a DC voltage to said DC electrode with a negative electrode bias, in combination with application of an AC voltage through the AC electrodes, within the dielectrophoresis chamber; and
   collecting a first eluent from the dielectrophoresis chamber, wherein the first eluent comprises the semiconducting single wall carbon nanotubes and is depleted of the metallic single wall carbon nanotubes, and wherein the semiconducting and metallic single wall carbon nanotubes differ by conductivity and at least one of diameter, length, and combinations thereof.

12. The method according to claim 11, wherein the first fraction is at least 70% depleted of the metallic nanotubes.

13. The method according to claim 11, wherein the flow rate is at least 0.02 cc/minute.

14. The method according to claim 11, wherein the dielectrophoresis chamber comprises interdigitated electrodes adapted for the application of the AC voltage and an opposing plate electrode adapted for the application of the DC voltage.

15. The method according to claim 11, wherein the dielectrophoresis chamber comprises coaxial electrodes adapted for the application of the AC and DC voltages.

16. A method for separating a first fraction of single wall carbon nanotubes and a second fraction of single wall carbon nanotubes, the method comprising:
   laminarly flowing a solution comprising the first fraction and the second fraction of single wall carbon nanotubes into a dielectrophoresis chamber; providing, within the dielectrophoresis chamber, at least one DC electrode and at least two AC electrodes, wherein the DC electrode and the AC electrodes are positioned on opposing walls of the dielectrophoresis chamber;
   applying a DC voltage to said DC electrode with a negative electrode bias, in combination with application of an AC voltage through the AC electrodes, within the dielectrophoresis chamber, wherein the AC has a frequency larger than 10 MHz; and
   collecting a first eluent from the dielectrophoresis chamber, wherein the first eluent comprises the first fraction of single wall carbon nanotubes and is depleted of the second fraction of single wall carbon nanotubes, wherein the first fraction and the second fraction differ by at least one of diameter, length, and combinations thereof.

17. The method according to claim 16, wherein the single wall carbon nanotubes comprise semiconducting single wall carbon nanotubes and metallic single wall carbon nanotubes.

18. The method according to claim 16, wherein the single wall carbon nanotubes are substantially semiconducting.

19. The method according to claim 16, wherein the single wall carbon nanotubes are substantially metallic.

20. The method according to claim 1, wherein the AC has a frequency larger than 10 MHz.

21. The method according to claim 11, wherein the AC has a frequency larger than 10 MHz.

* * * * *